United States Patent [19]

Mattila et al.

[11] Patent Number: 5,956,071
[45] Date of Patent: Sep. 21, 1999

[54] MECHANISM FOR POSITIONING FILM INTO A SCANNING POSITION IN AN INTERNAL DRUM LASER SCANNER ASSEMBLY

[75] Inventors: Robert J. Mattila, Woodbury; Larry R. Boughten, Hugo; John J. Allen, Mendota Heights, all of Minn.

[73] Assignee: Eastman Kodak Company, Rochester, N.Y.

[21] Appl. No.: 08/939,365

[22] Filed: Sep. 29, 1997

[51] Int. Cl.[6] .................................................. G03B 27/53
[52] U.S. Cl. .......................... 347/262; 347/264; 271/239; 271/243; 271/249; 346/138
[58] Field of Search .................................. 347/262, 263, 347/264; 346/136, 138; 271/3.19, 239, 240, 243, 244, 247, 249; 399/39; 270/58.05; 358/296; 371/21.1

[56] References Cited

U.S. PATENT DOCUMENTS

| | | | |
|---|---|---|---|
| 3,750,189 | 7/1973 | Fleischer | 347/137 |
| 4,040,096 | 8/1977 | Starkweather | 358/302 |
| 4,475,787 | 10/1984 | Starkweather | 359/211 |
| 4,496,209 | 1/1985 | Itoh et al. | 359/206 |
| 4,606,601 | 8/1986 | Starkweather | 359/211 |
| 4,625,315 | 11/1986 | Lemberger et al. | 372/38 |
| 4,750,045 | 6/1988 | Ohara et al. | 358/494 |
| 4,853,709 | 8/1989 | Stein et al. | 347/259 |
| 4,936,643 | 6/1990 | Beiser | 359/212 |
| 5,063,292 | 11/1991 | Brueggemann | 250/236 |
| 5,114,217 | 5/1992 | Beiser | 359/216 |
| 5,121,163 | 6/1992 | Muramatsu et al. | 399/39 |
| 5,196,957 | 3/1993 | Brueggemann | 359/206 |
| 5,208,701 | 5/1993 | Maeda | 359/574 |
| 5,227,910 | 7/1993 | Khattak | 359/211 |
| 5,235,467 | 8/1993 | Nagamachi | 359/742 |
| 5,247,383 | 9/1993 | Brueggemann | 359/197 |
| 5,263,698 | 11/1993 | Higuchi et al. | 270/58.05 |
| 5,455,708 | 10/1995 | Harris et al. | 359/226 |
| 5,486,694 | 1/1996 | Harris | 250/236 |
| 5,488,906 | 2/1996 | Iron et al. | 346/138 |
| 5,498,869 | 3/1996 | Appel et al. | 250/236 |
| 5,517,330 | 5/1996 | Maeda | 358/481 |
| 5,566,016 | 10/1996 | Lee | 359/206 |
| 5,596,190 | 1/1997 | Li et al. | 250/236 |
| 5,610,751 | 3/1997 | Sweeney et al. | 359/197 |
| 5,660,384 | 8/1997 | Kovach et al. | 271/145 |
| 5,709,382 | 1/1998 | Shima | 371/21.1 |
| 5,710,634 | 1/1998 | Kuriyama et al. | 358/296 |
| 5,722,651 | 3/1998 | Pankhania | 271/3.19 |
| 5,879,003 | 3/1999 | Kovach et al. | 271/121 |

FOREIGN PATENT DOCUMENTS

| | | |
|---|---|---|
| 0 740 454 A2 | 10/1996 | European Pat. Off. . |
| 9 766 116 A2 | 4/1997 | European Pat. Off. . |
| 2 207 773 | 2/1989 | United Kingdom . |
| WO 95/30934 | 11/1995 | WIPO ............................ G03D 13/00 |

OTHER PUBLICATIONS

Beiser, *Optical Scanners*, VHC Publishers, Inc., New York, NY, Copyright 1995, pp. 337–368.

Beiser, "Design Equations for a Polygon Laser Scanner", *Beam Deflection and Scanning Technologies*, vol. 1454, SPIE Proceedings Feb. 25—Mar. 1, 1991, SPIE Publishers, Bellingham, Washington, pp. 60–66.

Beiser, "Resolution of Laser Scanners", *Optical Engineering*, vol. 23, No. 3, May/Jun. 1984, pp. 266–268.

*Primary Examiner*—N. Le
*Assistant Examiner*—Hai C. Pham
*Attorney, Agent, or Firm*—Steven E. Dicke; William K. Weimer

[57] ABSTRACT

An assembly for positioning a piece of photosensitive film into a scanning position on a curved film platen and an internal drum scanner assembly. The film platen is defined by a film feed edge and a film stop edge. An alignment mechanism is positioned proximate the film stop edge and a feed mechanism is positioned proximate the film feed edge. The feed mechanism operates to feed the leading edge of the film from the film feed edge along the film platen towards the film stop edge alignment mechanism, and wherein when the photosensitive film is in the scanning position, the photosensitive film is compressed against the curved film platen in alignment between the alignment mechanism and the feed mechanism. A centering mechanism is also provided.

20 Claims, 14 Drawing Sheets

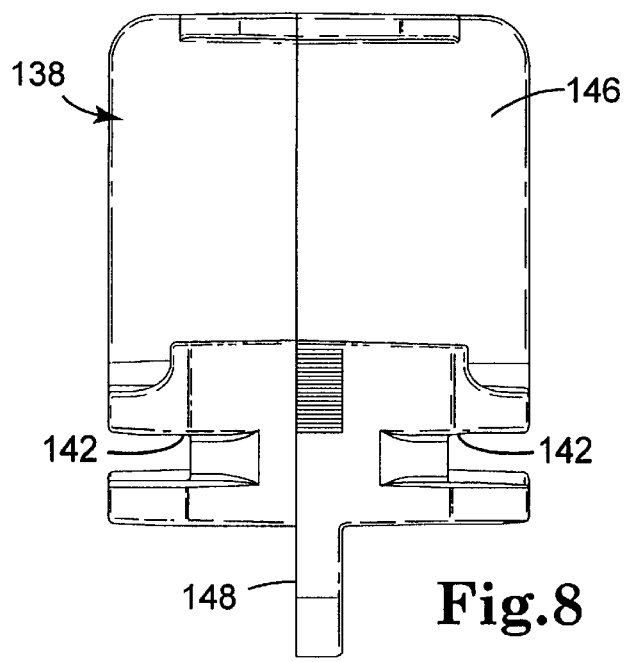
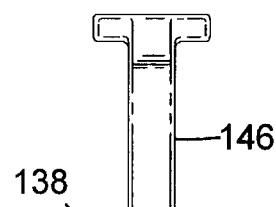
Fig. 8
Fig. 7
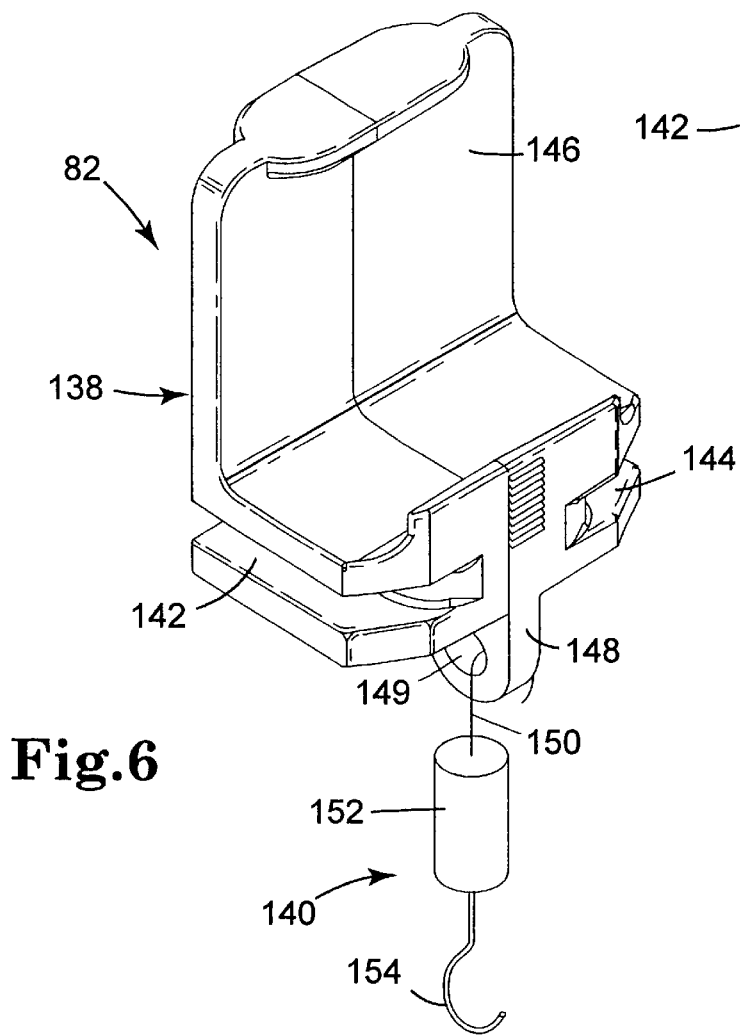
Fig. 6

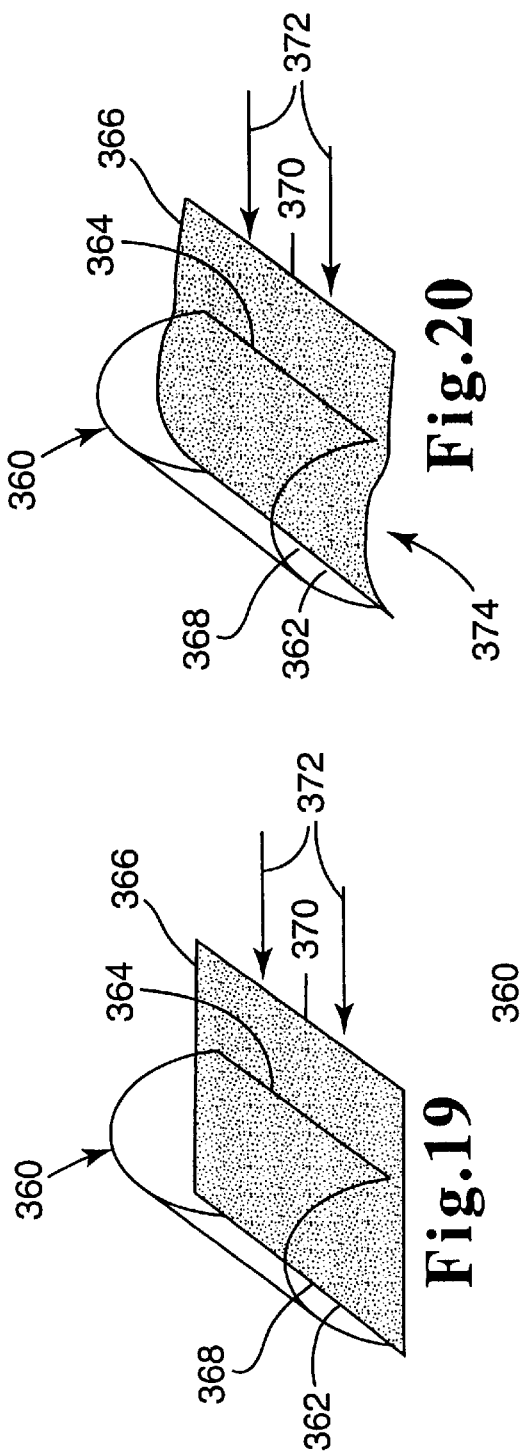

MECHANISM FOR POSITIONING FILM INTO A SCANNING POSITION IN AN INTERNAL DRUM LASER SCANNER ASSEMBLY

BACKGROUND OF THE INVENTION

The present invention relates generally to internal drum scanner assemblies and laser imaging systems incorporating such scanner assemblies. In particular, the present invention relates to a mechanism for aligning and centering film into a scanning position in an internal drum type scanner assembly, suitable for use in a medical imaging system.

Laser imaging systems are commonly used to produce photographic images from digital image data generated by magnetic resonance (MR), computed tomography (CT) or other types of scanners. Systems of this type typically include a continuous tone laser imager for exposing the image on photosensitive film, a film processor for developing the film, and an image management subsystem for coordinating the operation of the laser imager and the film processor.

The digital image data is a sequence of digital image values representative of the scanned image. Image processing electronics within the image management subsystem processes the image data values to generate a sequence of digital laser drive values (i.e., exposure values), which are input to a laser scanner. The laser scanner is responsive to the digital laser drive values for scanning across the photosensitive film in a raster pattern for exposing the image on the film.

The continuous-tone images used in the medical imaging field have very stringent image-quality requirements. A laser imager printing onto transparency film exposes an image in a raster format, the line spacing of which must be controlled to better than one micrometer. In addition, the image must be uniformly exposed such that the observer cannot notice any artifacts. In the case of medical imaging, the observers are professional image analysts (e.g., radiologists).

Film exposure systems are used to provide exposure of the image on photosensitive film. Known film exposure systems include a linear translation system and a laser or optical scanning system. The laser scanning system includes a laser scanner with unique optical configurations (i.e., lenses and mirrors), for exposure of the image onto the film. A linear translation system is a mechanical device that converts rotary motion into linear motion. The linear translation system provides for movement of the laser scanning system in a direction perpendicular to the scanning direction, such that a full image may be scanned on a piece of photosensitive film.

In an internal drum type laser scanner assembly, a piece of film is positioned onto a film platen, wherein the film platen has a partial cylindrical or partial drum shape. The photosensitive film is positioned against the film platen. The laser or optical scanning system is positioned at the center of curvature of the photosensitive film for scanning a scan line across the photosensitive film surface. A linear translation system moves the laser or optical scanning system lengthwise along a longitudinal axis as defined by the center of curvature of the film to expose an entire image onto the film.

The film may be fed into the film platen utilizing a film transport system which often incorporates a plurality of feed rollers. Once the piece of photosensitive film is fed onto the film platen, the film must be held tight against the curved surface of the film platen, and centered and aligned into a scanning position in order for in image to be correctly exposed onto the photosensitive film. Often such methods and mechanisms for aligning and centering a piece of film on the internal surface of the film platen require multiple complex mechanical and electrical components and control systems.

SUMMARY OF THE INVENTION

The present invention provides an assembly for positioning a film into a scanning position on a curved film platen in an internal drum scanner assembly. The film platen is defined by a first edge, a second curved edge, a film feed edge, and a film stop edge. The assembly comprises a first slider block assembly and a second slider block assembly which is spaced from the first slider block assembly a distance less than the width of the leading edge of the photosensitive film. A feed mechanism is positioned proximate the film feed edge, for feeding a piece of photosensitive film having a leading edge along the curved film platen. The leading edge of the film is fed from a location proximate the film feed edge towards the film stop edge. When the photosensitive film is in the scanning position, the leading edge of the photosensitive film contacts the first slider assembly and the second slider assembly. The photosensitive film is tensioned against the curved film platen in alignment between the first slider assembly and the second slider assembly and the feed mechanism.

The first slider block assembly and the second slider block assembly extend through the film platen. The first slider block assembly and the second slider block assembly are adjustably coupled to the film platen.

The first slider block assembly and the second slider block assembly include a slider block, a spring mechanism, and means for coupling the spring mechanism between the slider block and the film platen. The slider block may include a stop member extending inward from the film platen and guide means for slidably coupling the slider block to the film platen.

The first slider block assembly and the second slider block assembly are installable in the film platen from the curved film platen. The first slider block assembly and the second slider bock assembly extend through a configured opening in the film platen. The configured opening includes a rail portion for slidably coupling the slider block to the film platen. The configured opening may further include a first open portion for passing the slider block through the film platen, and a second open portion to aid in coupling the slider mechanism to the film platen. The feed mechanism may include a pair of feed rollers. The feed rollers are coupled to a control mechanism. In a known application, the feed rollers are longitudinally extending members which are generally parallel to the first slider mechanism and the second slider mechanism.

The assembly in accordance with the present invention may further include a centering mechanism movably coupled to the film platen which center the photosensitive film into the scanning position. The centering mechanism can include a slot adjacent the first curved edge, and a centering arm extending through the slot. Means are coupled through the centering arm to move the film along the film platen in a direction generally perpendicular to the feed direction of the film. The means for moving the film may include a motor having a screw mechanism coupled to the centering arm.

BRIEF DESCRIPTION OF THE DRAWINGS

The accompanying drawings are included to provide a further understanding of the present invention and are incorporated in and constitute a part of this specification. The drawings illustrate exemplary embodiments of the present invention and together with the description serve to explain the principles of the invention. Other objects of the present invention and many attendant advantages of the present invention will be readily appreciated as the same becomes better understood by reference to the following detailed description when considered in connection with the accompanying drawings, in which like reference numerals designate like parts throughout the figures:

FIG. 6 is a perspective view illustrating an exemplary embodiment of a slider block assembly in accordance with the present invention;

FIG. 7 is a side view of the slider block of FIG. 6;

FIG. 8 is a front view of the slider block of FIG. 6;

FIG. 19 is a perspective view illustrating an exemplary embodiment of another mechanism for positioning a piece of photosensitive film into a scanning position on a curved film platen;

FIG. 20 is a perspective view illustrating an exemplary embodiment of another step in utilizing the mechanism of FIG. 19 for positioning a piece of photosensitive film about the internal surface of a curved film platen;

FIG. 21 is a perspective view illustrating an exemplary embodiment of another step in utilizing the mechanism of FIG. 19 for positioning a piece of photosensitive film about the internal surface of a curved film platen; and FIG. 22 is a perspective view illustrating an exemplary embodiment of another step in utilizing the mechanism of FIG. 19 for positioning a piece of photosensitive film about the internal surface of a curved film platen.

DETAILED DESCRIPTION OF THE PREFERRED EMBODIMENTS

Figure 1:
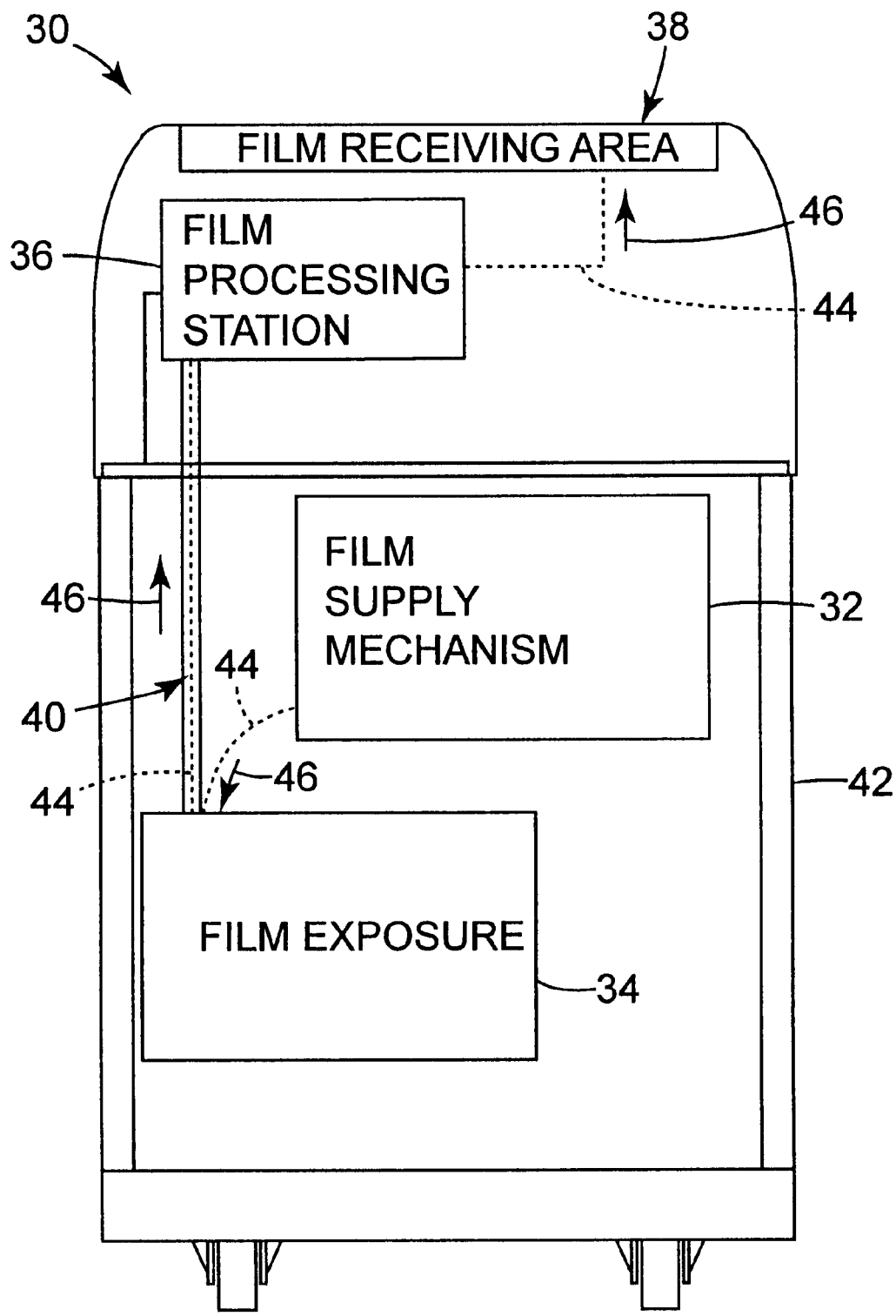
FIG. 1 is an elevational diagram of a laser imaging apparatus including a film exposure assembly having a mechanism for positioning film in accordance with the present invention.

FIG. 1 is an elevational diagram illustrating an exemplary embodiment of a laser imaging system 30 suitable for use in the medical imaging industry including a film exposure assembly having a mechanism for positioning a photosensitive film into a scanning position on a curved film platen of an internal drum scanner assembly, in accordance with the present invention. The imaging system 30 includes a film supply mechanism 32, a film exposure assembly 34, a film processing station 36, a film receiving area 38, and a film transport system 40. The film supply mechanism 32, film exposure assembly 34, film processing station 36, and film transport system 40 are all located within an imaging system housing 42.

Photosensitive film is stored within the film supply mechanism 32. The film transport system 40 allows the photosensitive film to be moved between the film exposure assembly 34, film processing station 36, and the film receiving area 38. The film transport system 40 may include a roller system (not shown) to aid in transporting the film along a film transport path, indicated by dashed line 44. The direction of film transport along film transport path 44 is indicated by arrows 46. In particular, the film supply mechanism 32 includes a mechanism for feeding a piece of film along film transport path 44 into the film exposure assembly 34 for exposing the desired image on the photosensitive film using a laser or optical scanner assembly. After exposure of the desired image on the photosensitive film, the photosensitive film is moved along the film transport path 44 to the film processing station 36. The film processing station 36 develops the image on the photosensitive film. After film development, the photosensitive film is transported to the film receiving area 38. One film supply and pickup mechanism suitable for use in a laser imaging system in accordance with the present invention is as disclosed in U.S. patent application Ser. No. 08/939,510, filed on Sep. 29, 1997, bearing Attorney Docket No. 20032/104/101, the entire contents of which are incorporated herein by reference. One suitable film processing station is as disclosed in U.S. patent application Ser. No. 08/940,091, filed on Sep. 29, 1997, bearing Attorney Docket No. 20032/106/101, and U.S. patent application Ser. No. 08/239,709, filed May 9, 1994, the entire contents of which are incorporated herein by reference.

Figure 2:
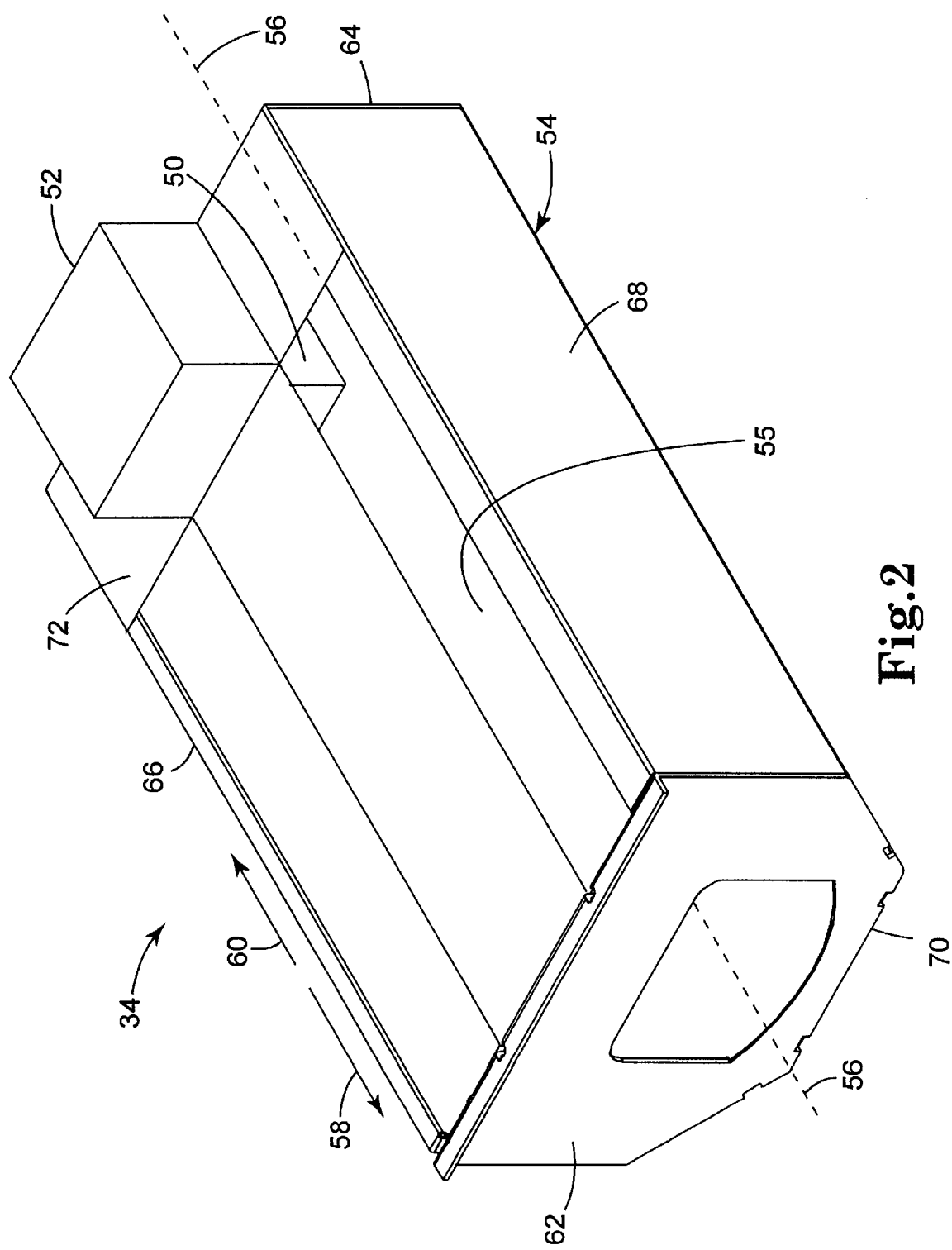
FIG. 2 is a perspective view of an exemplary film exposure assembly for use in a laser imaging apparatus having a mechanism for positioning film, in accordance with the present invention.

In FIG. 2, a top perspective view of one exemplary embodiment of the film exposure assembly 34 including a mechanism for positioning a photosensitive film into a scanned position in accordance with the present invention is shown. The film exposure assembly 34 has an internal-drum type configuration. In the exemplary embodiment shown, the film exposure assembly 34 includes a laser or optical scanner assembly 50 mechanically coupled to a linear translation system 52, mounted within drum frame 54 for exposure of the film. The drum frame 54 includes a curved film platen 55, which can be defined as the internal drum surface. The center of curvature of the curved film platen 55, which is located along the drum longitudinal axis, is indicated by dashed line 56. During a scanning process, the optics translation system 52 operates to move the optical scanner assembly 50 along the longitudinal axis 56 (in a direction generally perpendicular to the scanning direction), indicated by directional arrow 58, and after scanning, returns the optical scanner assembly 50 to a start position, along the longitudinal axis 56, indicated by directional arrow 60. One suitable linear translation system for use in a film exposure assembly in accordance with the present invention is as disclosed in U.S. patent application Ser. No. 08/939,420, filed on Sep. 29, 1997, bearing attorney docket number 20032/103/101, the entire contents of which are incorporated herein by reference.

In one exemplary embodiment shown, drum frame 54 is constructed of metal, and includes a first end 62, a second end 64, a first side 66, a second side 68, a bottom 70, and a top 72. Film platen 55 is positioned within the drum frame 54. Film platen 55 provides a cylindrical or partially cylindrically-shaped scanning surface.

The linear translation system 52 extends along the top 72 for positioning the optical scanner assembly 50 along the center of curvature (of a piece of film in scanning position on the film platen), indicated as longitudinal axis 56. In particular, the linear translation system 52 is positioned between the first end 62 and the second end 64.

Figure 3:
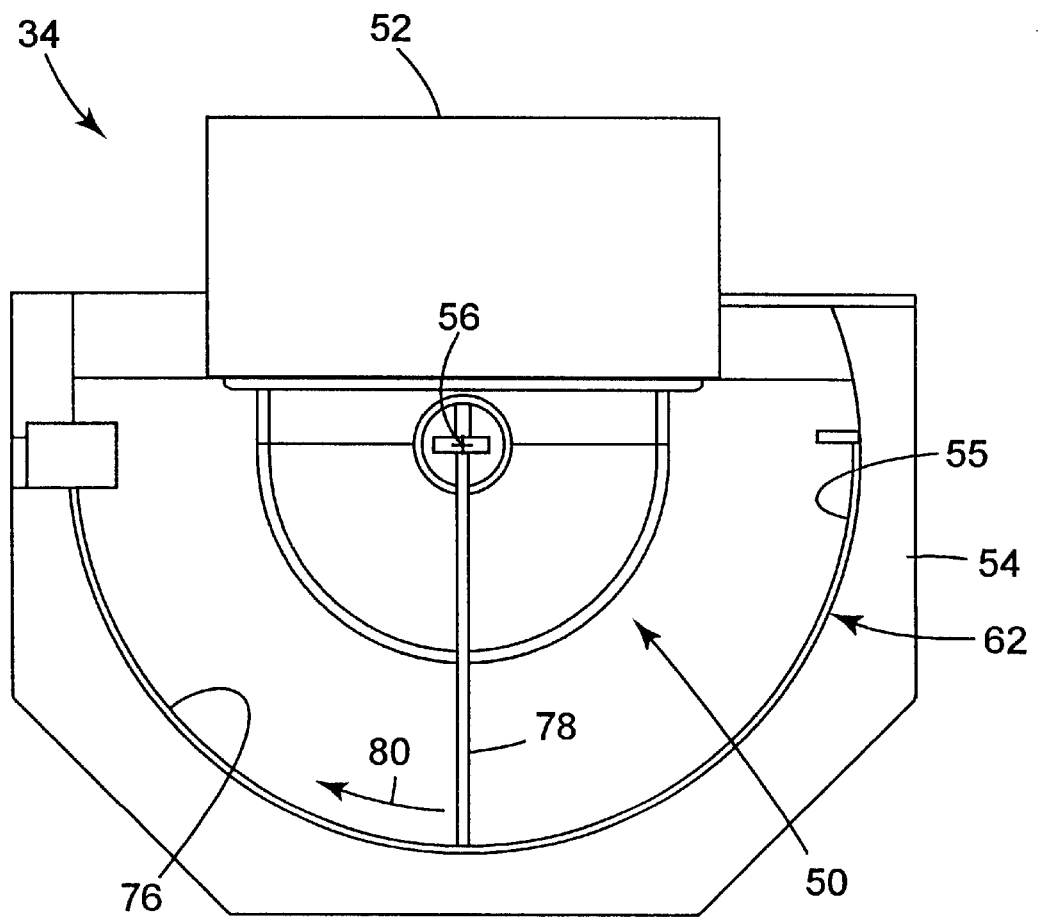
FIG. 3 is an end view of the film exposure assembly shown in FIG. 2.

Referring to FIG. 3, an end elevational view of the film exposure assembly 34 is shown, having a portion of the drum frame 54 removed for clarity. Laser or optical scanner assembly 50 is shown mechanically coupled to the linear translation system 52, positioned along the center of curvature 56. One suitable optical scanner assembly for use with the optics translation system in accordance with the present invention is disclosed in U.S. patent application Ser. No. 08/939,900, filed on Sep. 29, 1997, bearing attorney docket number 20030/106/101, the entire contents of which are incorporated herein by reference. The above referenced optical scanner assembly incorporates a two-sided scanner mirror and novel optical lens configuration for scanning images about a scanned surface which are suitable for use in medical imaging applications.

A piece of photosensitive film 76 is shown positioned on the film platen 55. During exposure of the photosensitive film 76, the photosensitive film 76 is held against the film platen 55 in a scanning position. In a scanning position, the photosensitive film 76 assumes the shape of the curved film platen 55, which has a cylindrical, partial cylindrical, or drum shape. The photosensitive film 76 is positioned in a scanning position (i.e., aligned and centered) using the film positioning mechanism in accordance with the present invention. The film positioning mechanism in accordance with the present invention is detailed in this specification.

In the scanning position, the photosensitive film 76 is aligned, centered and held against the film platen 55. The optical scanner assembly 50 scans a laser beam representative of an image to be exposed on the film, across the film scanning surface in an image-wise pattern. In particular, the scanning laser beam (indicated at 78) emanates radially from the center of curvature 56 of the film platen 55 (and film 76), which is located along the center of curvature longitudinal axis 56. The optical scanner assembly 50 scans the laser beam containing image data representative of the image to be exposed in raster lines by rotating about the longitudinal axis 56 of the cylinder drum (indicated by directional arrow 80). As the optical scanner assembly 50 scans the image and raster lines in an image-wise pattern across the photosensitive film 76 located on the internal drum surface 55, the linear translation system 52 moves the optical scanner assembly 50 along the center of curvature longitudinal axis 56 to expose a full image on the photosensitive film. The linear translation system 52 moves the optical scanner assembly 50 along the longitudinal axis 56 in a direction which is generally perpendicular to the scanning direction of laser beam 78. Since the linear translation system 52 moves the optical scanner assembly 50 during each scan line, the resulting scan lines may not be perpendicular, but are "generally" perpendicular to the direction of movement of the linear translation system.

In one exemplary embodiment, the film exposure area on the internal drum surface is 17 inches by 14 inches, suitable for exposure of a 17 inch by 14 inch piece of photosensitive film. In the exemplary embodiment disclosed herein, the film is exposed in a vertical direction. In particular, since the film is fed into the exposure module in the 14 inch direction and subsequently scanned in the 17 inch direction, the scanned raster lines appear in the vertical direction. The laser beam is scanned 180° (or greater than 180° across the internal drum surface, for exposure of 17 inches across the photosensitive film. The linear translation system moves the optical scanner assembly along the longitudinal axis located at the center of curvature of the internal drum surface for a distance of 14 inches, for full exposure of a desired image/images on the photosensitive film.

The photosensitive film can be a photosensitive film which is sensitive to laser beam light. In one exemplary embodiment, the film is a light sensitive photothermalgraphic film having a polymer or paper base coated with an emulsion of dry silver or other heat sensitive material. One known film suitable for use in medical imaging processes with a film exposure system having a linear translation system in accordance with the present invention is commercially available under the trade name Dryview Imaging Film (DVB or DVC) manufactured by Imation Corp. of Oakdale, Minn.

A mechanism in accordance with the present invention for positioning a piece of photosensitive film into a scanning position on a curved film platen of an internal drum scanner assembly will be described in detail in the following paragraphs. The mechanism aligns and centers the photosensitive film, while holding or compressing the photosensitive film against the curved film platen in the scanning position, allowing an image to be precisely exposed on the photosensitive film.

Figure 4:
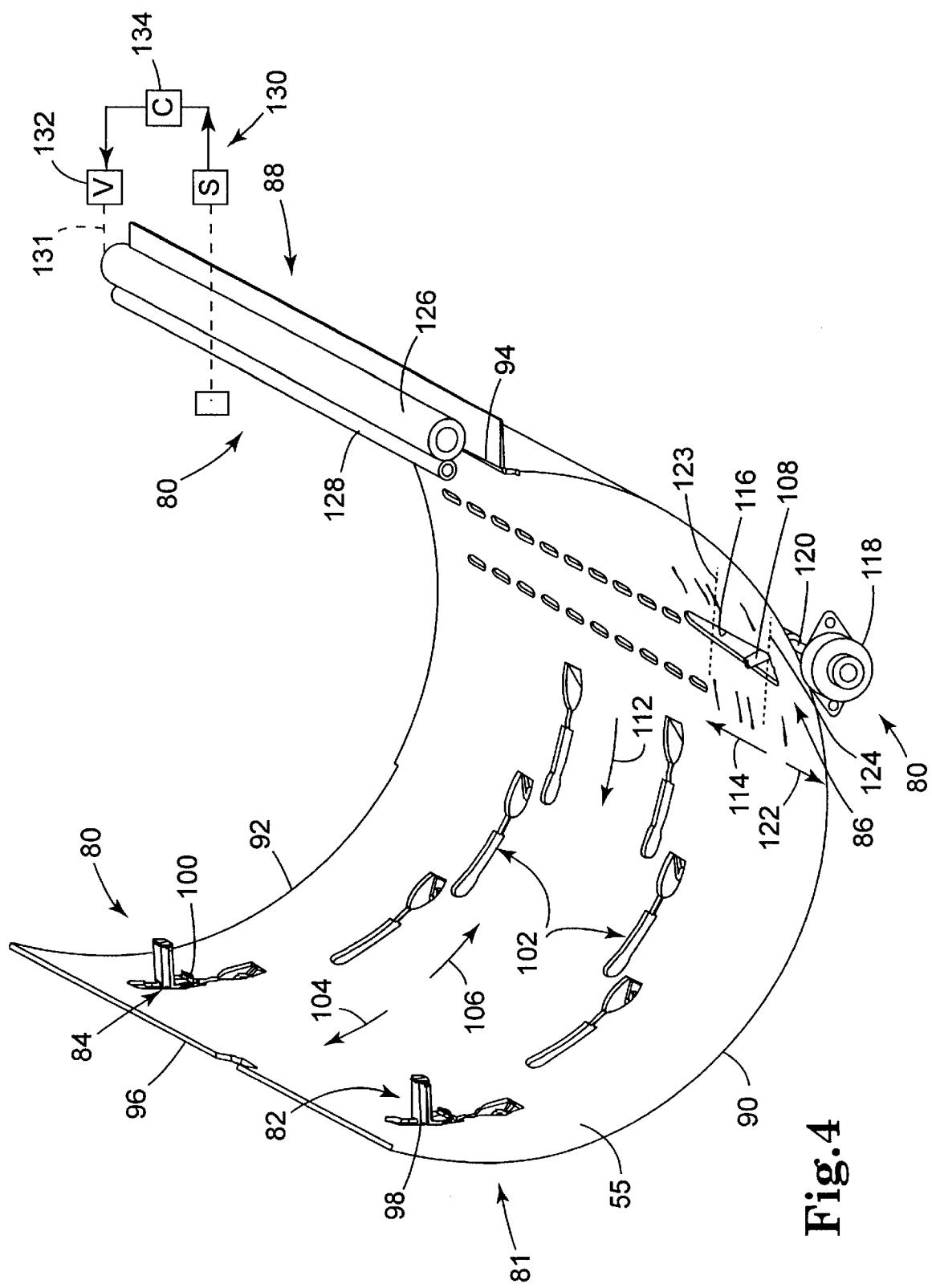
FIG. 4 is a perspective view of one exemplary embodiment of an internal drum scanner assembly film platen having a mechanism for positioning film, in accordance with the present invention.

Referring to FIG. 4, curved film platen 55 is shown having film positioning mechanism 80 operably coupled thereto. Film positioning mechanism 80 includes film alignment mechanism 81 having a first slider block assembly 82 and a second slider block assembly 84, film centering mechanism 86, and film feed mechanism 88. In one exemplary embodiment shown, the curved film platen 55 includes a first curved edge 90, a second curved edge 92, a film feed edge 94, and a film stop edge 96. Film feed mechanism 88 operates to feed a piece of photosensitive film onto the curved film platen 55. The leading edge of the photosensitive film is fed along the curved film platen 55 towards the film alignment mechanism 81, including first slider block assembly 82 and second slider block assembly 84. Once the leading edge of the photosensitive film contacts first slider block assembly 82 and second slider block assembly 84, the first slider block assembly 82, second slider block assembly 84, and the film feed mechanism 88 operate to align the photosensitive film in a direction generally parallel to film stop edge 96, and position (in compression) the photosensitive film against the curved film platen 55. Film centering mechanism 86 then operates to center the aligned piece of photosensitive film on the curved film platen 55 into a desired scanning position.

The first slider block assembly 82 and the second slider block assembly 84 extend through the curved film platen 55. Curved film platen 55 includes a first opening 98 and a second opening 100. Curved film platen 55 may include other slider block openings 102 which may be utilized for various sizes of photosensitive film. First slider block assembly 82 is movable within first opening 98 relative to the curved film platen 55 in a first direction 104 and a second direction 106. Similarly, second slider block assembly 84 is movable within second opening 100 relative to the curved film platen 55 in the first direction 104 and the second direction 106. First slider block assembly 82 and second slider block assembly 84 are biased in the second direction 106. Further, first slider block assembly 82 and second slider block assembly 84 are movable independent of each other. It is also recognized that first slider block assembly 82 and second slider block assembly 84 may include a single bar extending across the film platen 55 which is capable of independent movement at each end.

Centering mechanism 86 operates to center an aligned piece of photosensitive film into a scanning position on the curved film platen 55. In the exemplary embodiment shown, the centering mechanism 86 includes a centering arm 108 mechanically coupled to a mechanism for moving the photosensitive film across the film platen 55 in a direction generally perpendicular to the feed direction 112, indicated at 114. The centering arm 108 extends through a slot 116 in the film platen 55. Slot 116 is preferably uniquely shaped to minimize film jams within the film platen. In one preferred embodiment shown, slot 116 is generally wedge shaped wherein the wedge narrow end extends inward into the film platen 55. The shape of slot 116 has been shown to minimize the possibility of the leading edge of film 76 catching on the slot 116 as the film 76 is fed onto the curved film platen 55.

In one exemplary embodiment, the film centering mechanism 86 includes a motor 118 having a screw member 120 coupled to its shaft. In turn, the screw member 120 is coupled to centering arm 108 which extends through slot 116 inward from the film platen 55. In one embodiment, the motor 118 is a relatively inexpensive linear stepper motor having a thrust rating of 3lbs and which travels a minimum 0.5 inch. Motor 118 is reversible, allowing center arm 108 to move in a second direction 122 from a centering position 123, and return to a rest position, indicated at 124.

Film feed mechanism 88 operates to receive a piece (or sheet) of film moving along the film transport path 44, and feed the piece of photosensitive film onto the curved film platen 55. Once the photosensitive film is in a scanning position, film feed mechanism 88 aids in pushing the film against slider block assemblies 82, 84 compressing the photosensitive film against the curved film platen 55 and slider block assemblies 82, 84. After exposing a desired image on the photosensitive film, film feed mechanism 88 operates to remove the photosensitive film from the curved film platen 55 along the film transport path 44 towards the film processing station 36.

In the exemplary embodiment shown, film feed mechanism 88 comprises a film transport roller assembly, including a pair of nip rollers positioned along the film feed edge 94. In particular, the film feed mechanism 88 includes a first or drive roller 126 and a second or pinch roller 128. A film sensing mechanism 130 may be positioned adjacent the film feed mechanism 88 to sense the absence or presence of a piece of film passing therethrough. Drive roller 126 is mechanically coupled (indicated at 131) to a motor 132 (e.g., such as by a pulley system) for operation of the film feed mechanism 88. In one exemplary embodiment, the film feed mechanism 88 is a film transport roller assembly as disclosed in U.S. patent application Ser. No. 08/939,510, filed Sep. 29, 1997, bearing attorney docket no. 20032/107/101, entitled "Film Transport Roller Assembly". In one exemplary embodiment, sensor mechanism 130 comprises an optical interrupt switch and is commercially available from Aleph Corp. Sensor mechanism 130 and motor 132 are electrically coupled to a controller 134 for selective activation of the drive roller 126.

Figure 5:
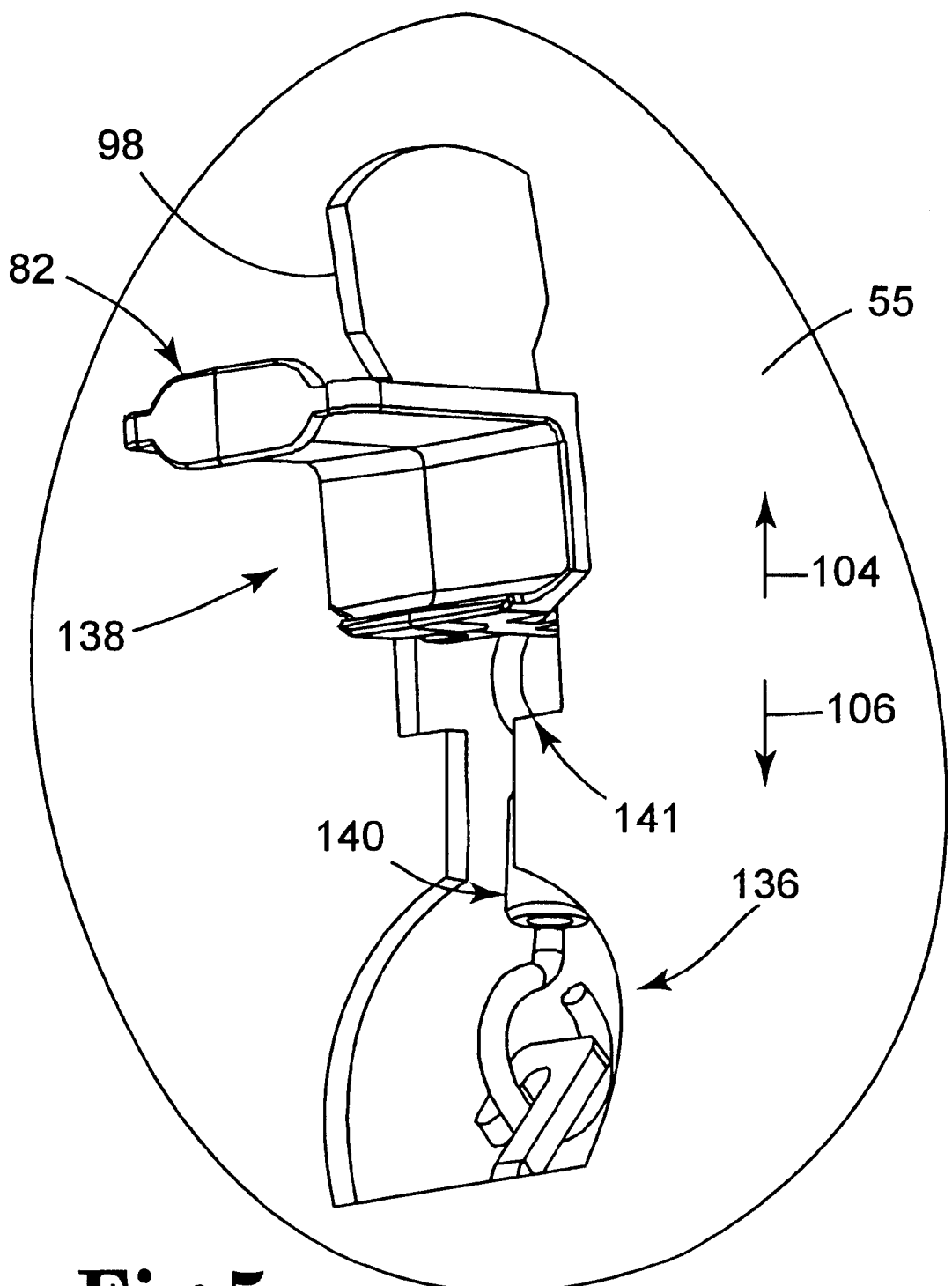
FIG. 5 is a perspective view illustrating an exemplary embodiment of a slider block assembly extending through a film platen in accordance with the present invention.

Referring to FIG. 5, one exemplary embodiment illustrating a slider block assembly in accordance with the present invention is shown, which is similar to first slider block assembly 82 and second slider block assembly 84, is shown indicated as first slider block assembly 82, extending through opening 98 in the curved film platen 55. First slider block assembly 82 is mechanically coupled to the film platen 55, indicated at 136. Slider block assembly 82 generally includes a slider block 138 and a spring mechanism 140. When first slider block assembly 82 is installed within opening 98, first slider block assembly 82 is movable in first direction 104 or second direction 106, and spring 140 biases the slider block 138 in the second direction 106. Without a piece of photosensitive film on the curved film platen 55, spring 140 biases slider block 138 against stop edge 141, with a spring tension of approximately 0.56 newtons. Under normal operation, the slider block assembly 82 travels about 5 mm in direction 104 to take up film 76. In one exemplary embodiment, when a sheet of photosensitive film 76 is positioned on the film platen 55, slider block assembly 82 moves 5 mm in direction 104, with spring 140 having a spring tension of approximately 1.03 newtons. It is recognized that the desired or preferred spring tension is dependent upon the strength (including size and thickness) of photosensitive film 76.

Referring to FIG. 6, a perspective view of slider block assembly 82 is shown. Slider block assembly 82 includes slider block 138 and spring mechanism 140. Slider block 138 includes first slider block channel 142 and second slider block channel 144, film edge contacting portion 146, and a mechanism 148 for coupling the slider block 138 to the spring mechanism 140. First slider block channel 142 and second slider block channel 144 are sized for slidable receipt of the walls of film platen 55 located about opening 98. During operation of slider block 138, film contacting surface 146 contacts the leading edge of a piece of film for alignment and compressing the piece of film in a scanning position. Coupling mechanism 148 (having an opening or aperture 149 passing therethrough) aids in coupling the slider block 138 to spring mechanism 140. Spring mechanism 140 further includes a slider block coupling mechanism 150, a spring 152, and a film platen coupling mechanism 154. Referring also to FIGS. 7 and 8, slider block 138 is generally L shaped and sized for insertion and slidable receipt within opening 98. In one preferred embodiment, slider block 138 is formed of a molded polymeric material, such as acetal.

Figure 9:
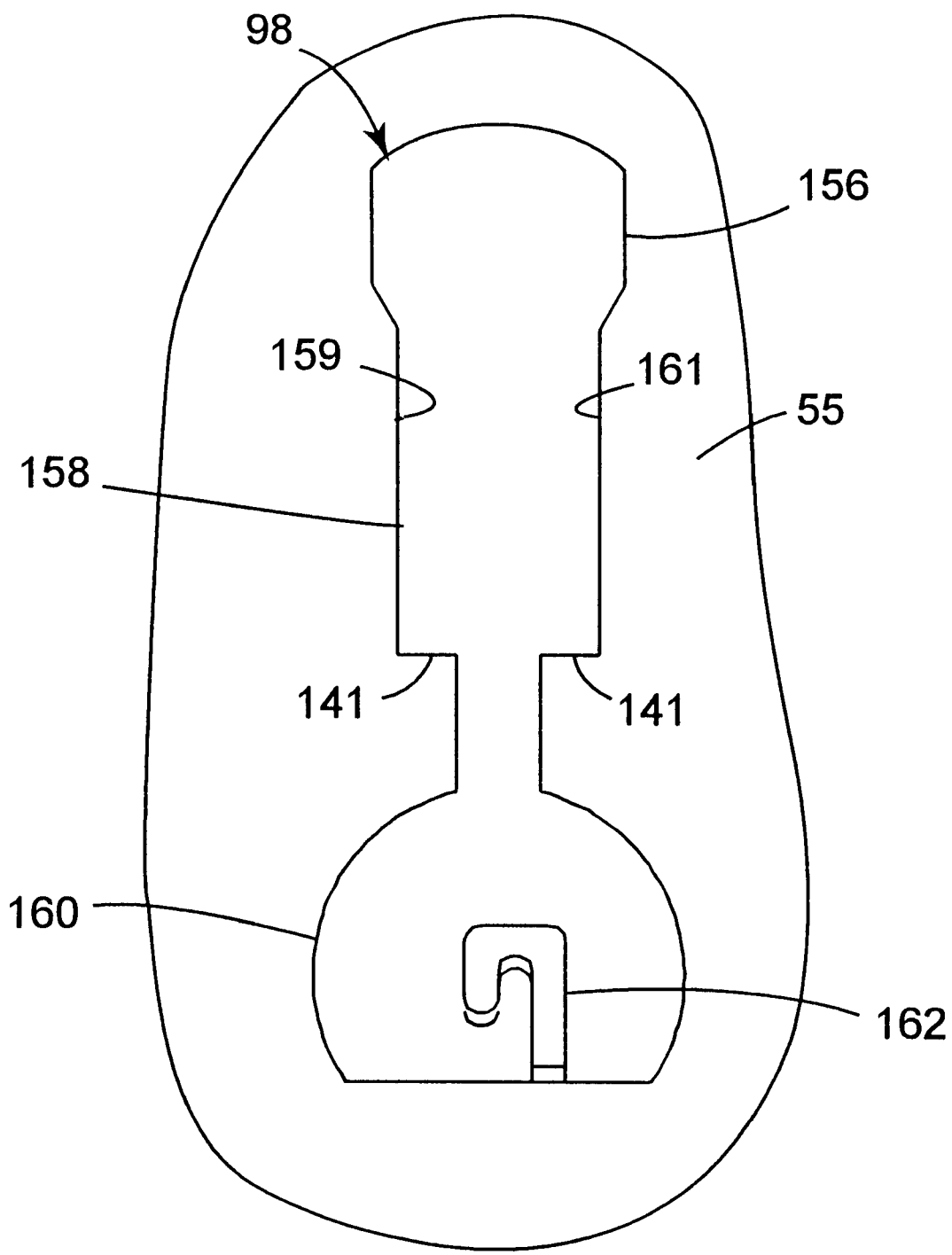
FIG. 9 is a partial view illustrating an exemplary embodiment of a film platen configured opening capable of receipt of a slider block assembly in accordance with the present invention.

Referring to FIG. 9, opening 98 is sized for receipt and movement of slider block assembly 82 therethrough. First opening 98 includes a slider block receiving area 156, a slider block movement area 158, and an access area 160. Further, a hook mechanism 162 is provided for coupling the curved film platen 55 to the first slider block assembly 82 coupling mechanism 154.

One unique feature of the slider block assembly in accordance with the present invention is that it may be completely installed within the film platen from the internal side of the film platen 55. As such, rear access is not necessary. The slider block assembly 82 is partially inserted through slider block receiving area 156 and positioned within slider block movement area 158. Spring mechanism 140 may now be coupled to hook mechanism 162 to complete installation of the slider block assembly 82 within opening 98. In particular, slider block assembly 82 is partially inserted through slider block receiving area 156 at an angle 90° relative to its position of normal operation. The slider block assembly 82 is then twisted or rotated into its operational position, such that channels 142, 144 are in alignment and receive the edges of slider block movement area 158 walls 159, 161. Once twisted or rotated into operating position, the slider block assembly 82 is no longer to fall through the opening 98, and is moveable within slider block operation channel 158. Spring mechanism 140, coupling mechanism 154, is mechanically coupled to hook mechanism 162. The spring mechanism 140 now biases the slider block assembly 82 into the correct position within slider block operating channel 158.

Figure 11:
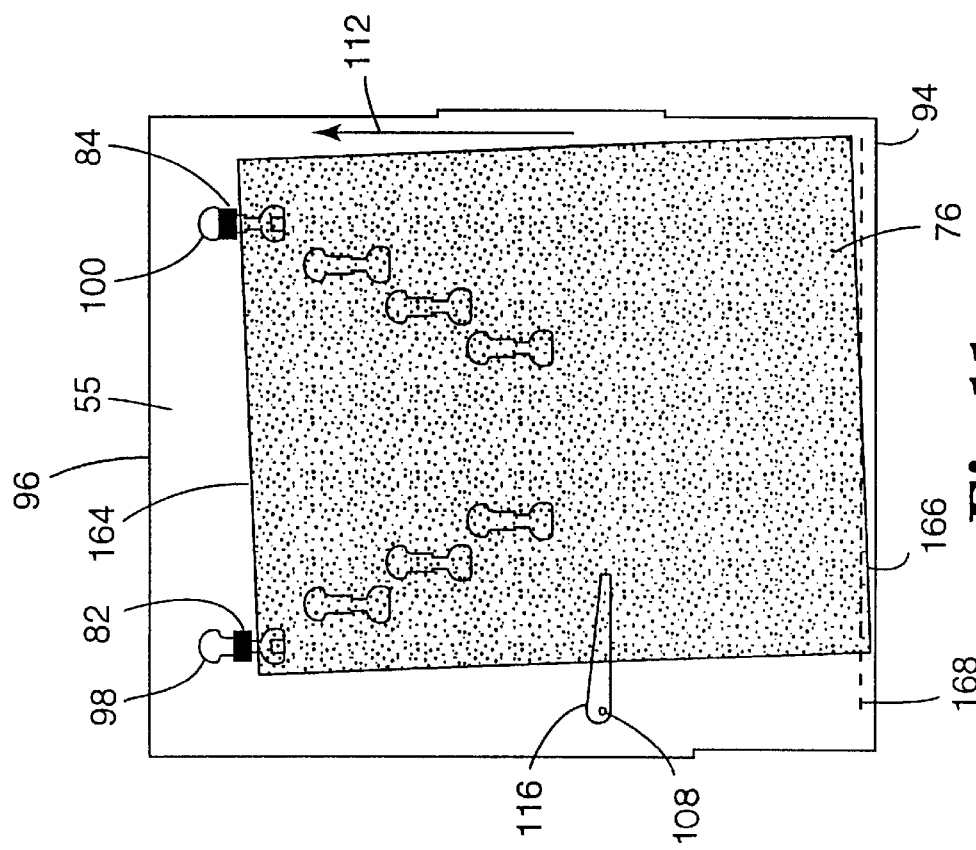
FIG. 11 is another diagram illustrating an exemplary embodiment of another step in positioning a film on a film platen using a mechanism in accordance with the present invention.
Figure 10:
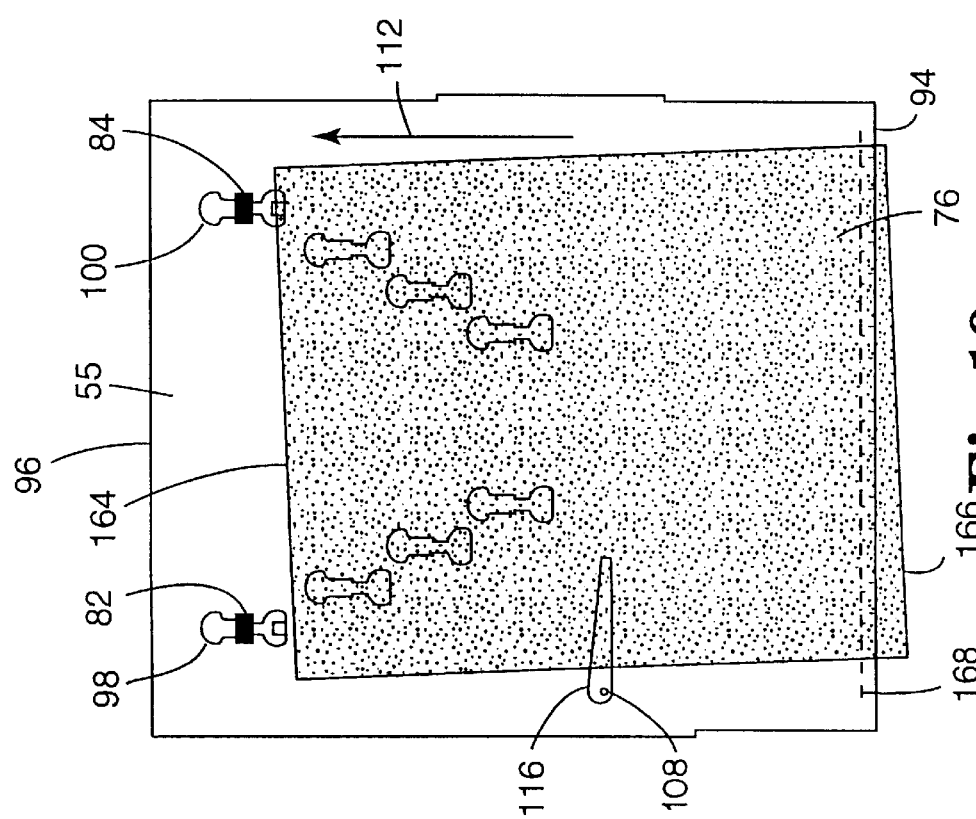
FIG. 10 is a diagram illustrating one exemplary embodiment of a step in positioning a film on a film platen using a mechanism in accordance with the present invention.
Figure 12:
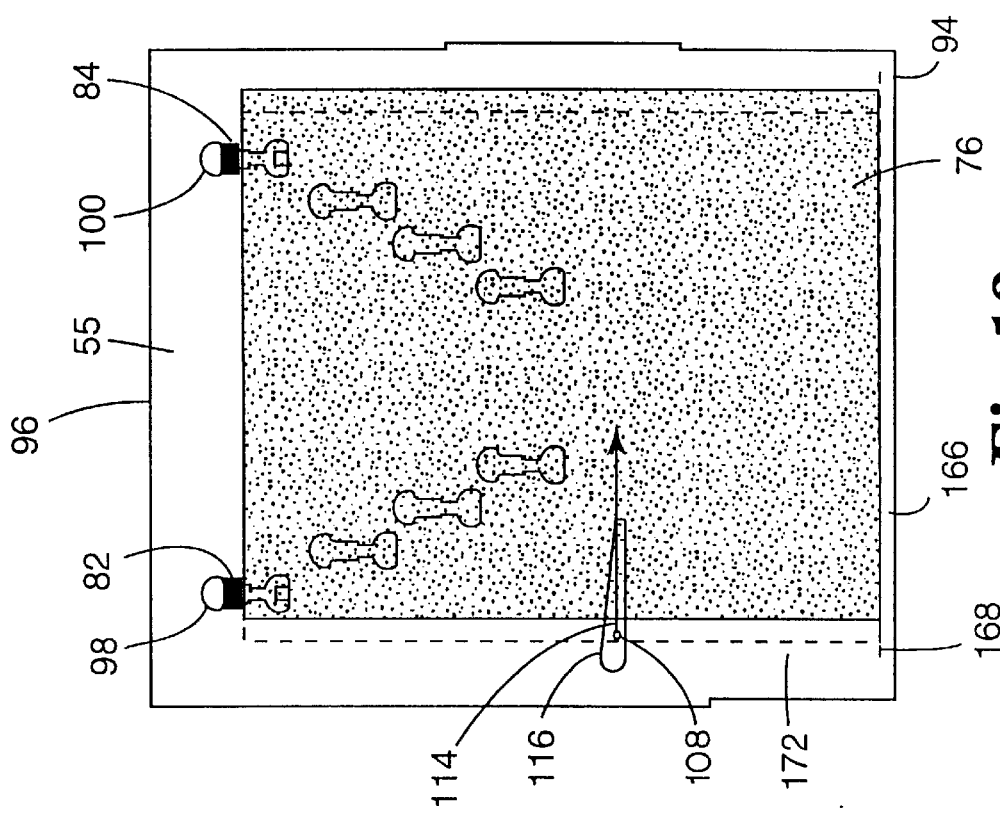
FIG. 12 is another diagram illustrating an exemplary embodiment of another step in positioning a film on a film platen using a mechanism in accordance with the present invention.
Figure 12A:
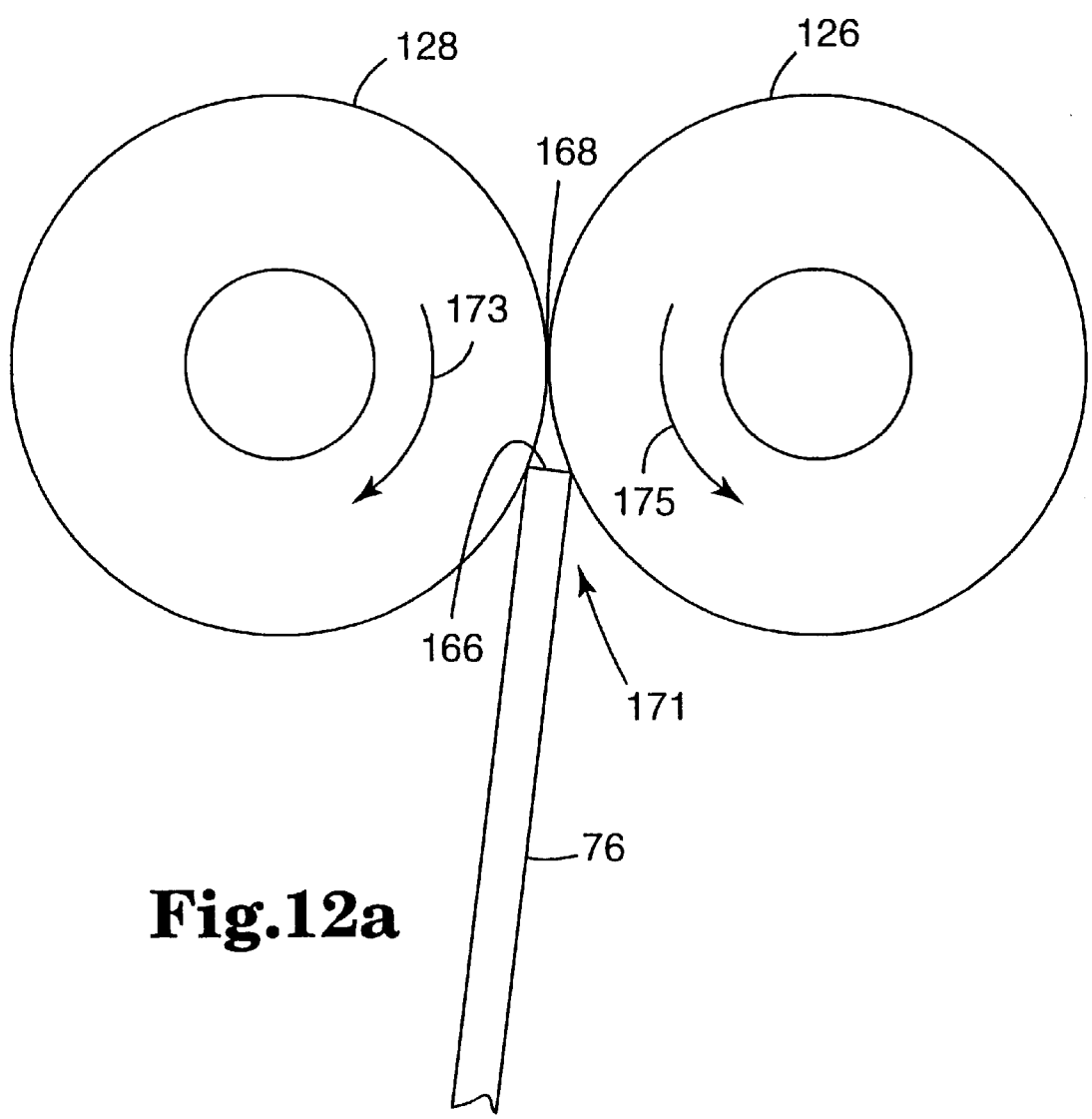
FIG. 12a is another diagram illustrating an exemplary embodiment of the trailing edge of a sheet of film positioned within the V region created by the film roller assembly in accordance with the present invention.

Referring to FIGS. 10–13, operation of the film positioning mechanism 80 is illustrated. Referring to FIG. 10, photosensitive film 76 includes a leading edge 164 and a trailing edge 166. Photosensitive film 76 enters the film platen 55 through the film feed mechanism 88 and continues around the curvature of the curved film platen 55, indicated by film feed direction 112. The film feed mechanism 88 roller assembly nip line is represented by dashed line 168. Referring to FIG. 11, the photosensitive film 76 continues around the curvature of the curved film platen 55. The photosensitive film 76 continues to travel until the trailing edge 166 has passed through the rollers of the film feed mechanism 88 and passes nip line 168, at which point the photosensitive film 76 is positioned between the roller nip and the spring loaded slider blocks. Referring to FIG. 12, as the rollers of the film feed mechanism 88 continue turning, the pressure from the first slider block assembly 82 and second slider block assembly 84 force the trailing edge 166 of the photosensitive film 76 to "snap" or move into alignment with the nip line 168 of the film feed mechanism 88 rollers. This completes alignment of the photosensitive film 76 within the curved film platen 55. Dashed line 170 indicates the position of the photosensitive film 76 before it was snapped into alignment by the film alignment mechanism 81 in accordance with the present invention. Referring also to FIG. 12a, a V-shaped region 171 is created by drive roller 126 and pinch roller 128 just past nip line 168, indicated at 171. As rollers 126, 128 continue to rotate, indicated by rotational arrows 173, 175, the trailing edge 166 is held within V region 171 against rollers 126, 128. As such, the sheet of photosensitive film 176 is held in compression against the curved film platen 55, with the leading edge 164 held against slider block assemblies 82, 84 and the trailing edge 166 positioned within V region 171 against drive roller 126 and pinch roller 128.

Figure 13:
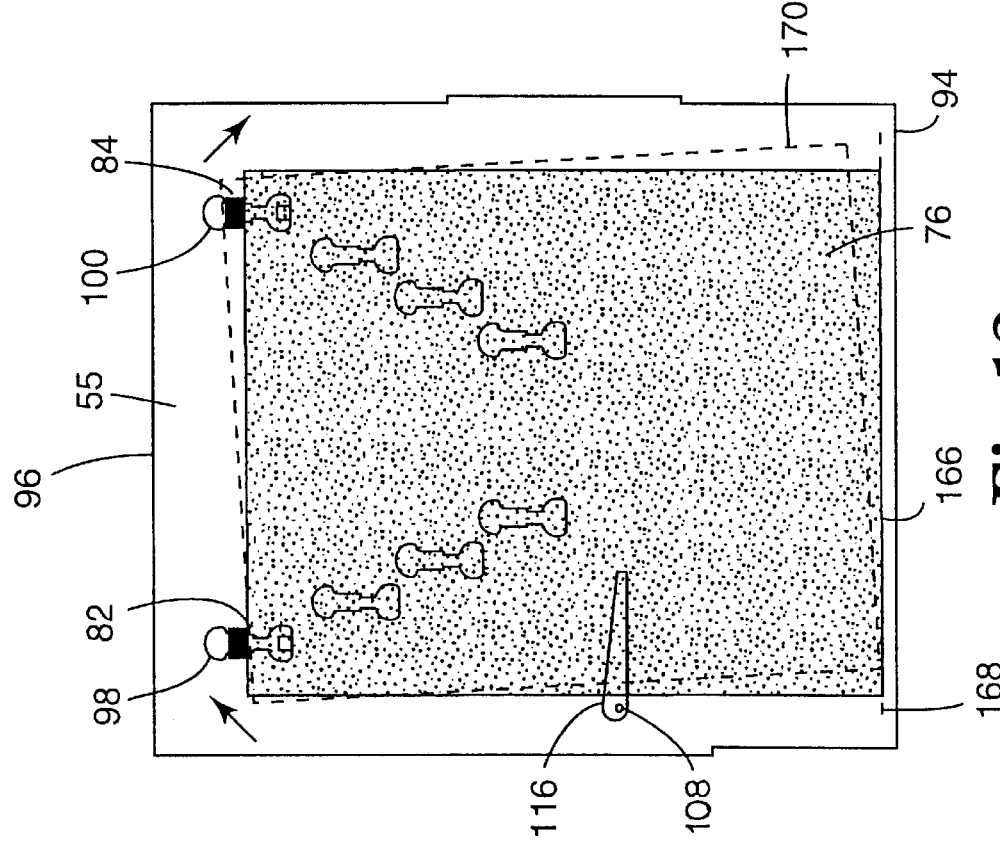
FIG. 13 is another diagram illustrating an exemplary embodiment of another step in positioning a film on a film platen using a mechanism in accordance with the present invention.

Referring to FIG. 13, centering of the photosensitive film 76 into the final scanning position is illustrated. The rollers of the film feed mechanism 88 continue to turn, and the centering mechanism 86 is actuated such that centering arm 108 moves in a first direction 114, a fixed distance in the axial direction of the curved film platen 55 to the desired centering position. Because the rollers of the film feed mechanism 88 continue turning, the friction of the trailing film edge 166 against the rollers 126, 128 within V region 171 just past nip line 168, is low enough such that the film can be pushed in a direction along the axial direction 114 of the curved film platen 55 while maintaining its alignment. As the photosensitive film 76 is moved or centered in the axial direction 114, the operation of rotating roller 126, 128 and film alignment mechanism 81 operate to continually bring the film 76 into alignment. As such, rollers 126, 128 continually push trailing edge 166 into V region 171 as the film is realigned. The position of photosensitive film 76 before centering is indicated by dashed line 172. Once the rollers of film positioning mechanism 86 stopped turning, the film 76 is securely retained against the surface of the curved film platen 55 in a scanning position. The film alignment mechanism slider block assemblies 82, 84 bias the film 76 against rollers 126, 128 with trailing edge 66 positioned within V region 171, and film 76 maintain a compression against the curved film platen 55.

Figure 14:
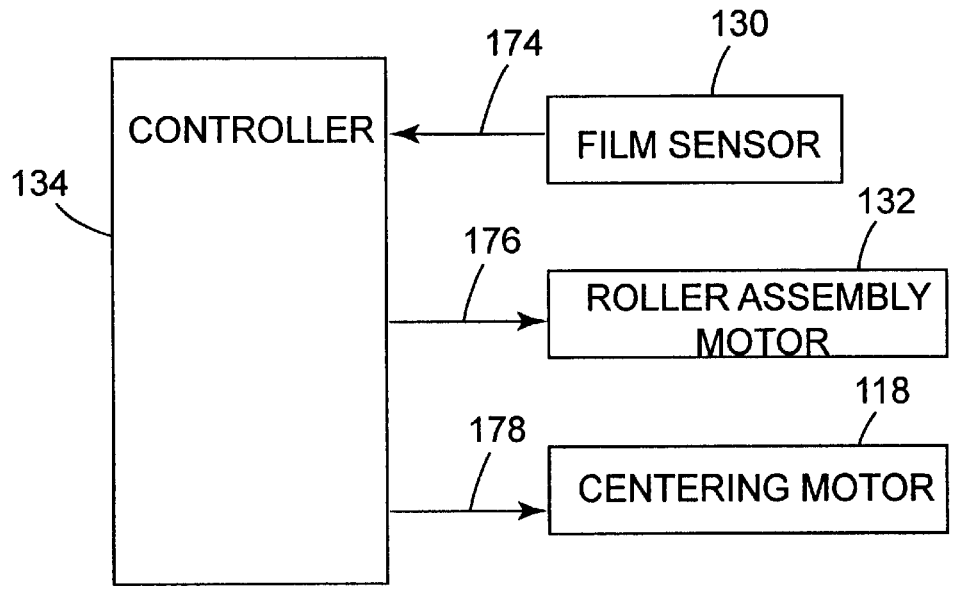
FIG. 14 is a control block diagram illustrating an exemplary embodiment of control operation of a film positioning mechanism in accordance with the present invention.

Referring to FIG. 14, a control block diagram of the film positioning mechanism 80 in accordance with the present invention is generally shown. Controller 134 is electrically coupled to sensor mechanism 130 (indicated at 174), film feed mechanism 88 motor 132 (indicated 176), and centering motor 118 (indicated at 178). Controller 134 provides output signal 176 for selective energization of motor 132 and provides output signal 178 for selective energization of centering motor 118 roller assembly for centering and alignment of the photosensitive film 55. Further, controller 134 is responsive to film sensor mechanism 130, indicated at 174, for timed and selective energization of the motor 132 and centering motor 118.

Figure 15:
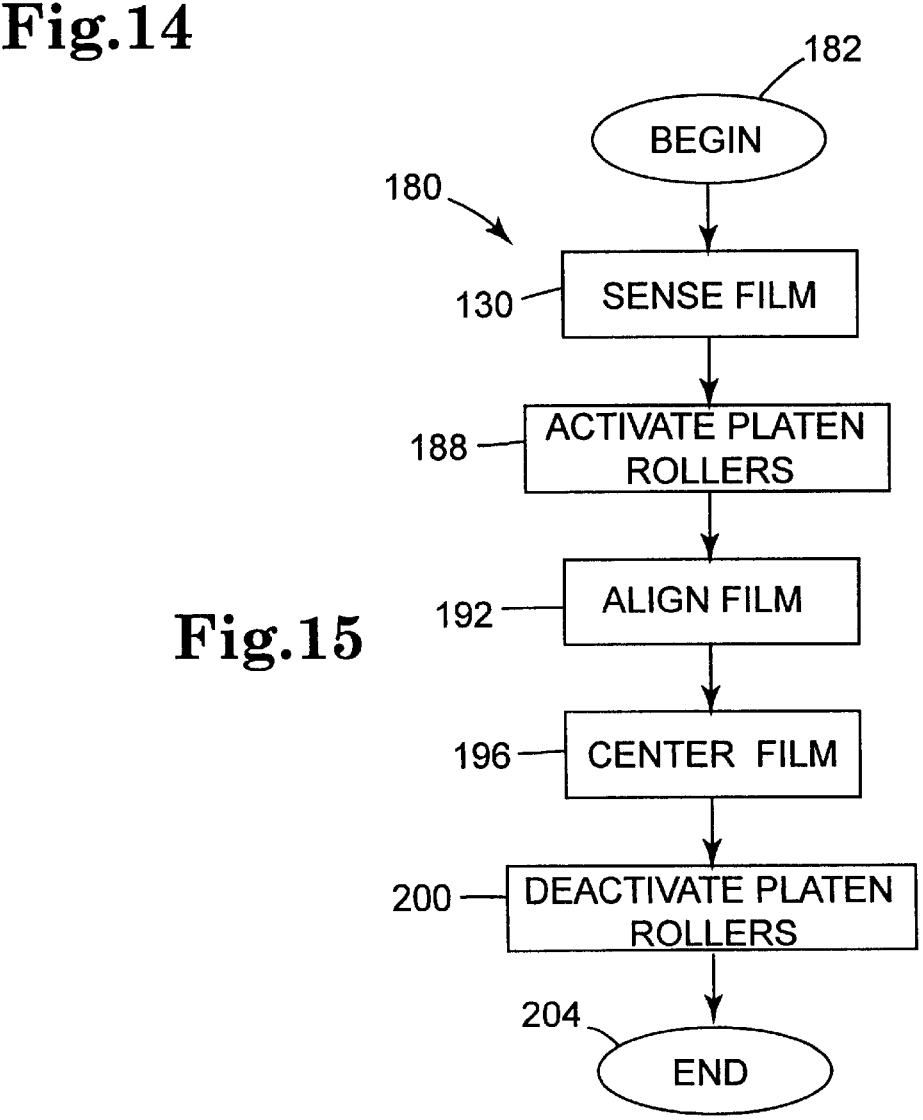
FIG. 15 is a block diagram illustrating one method of positioning a piece of film on a film platen using a mechanism in accordance with the present invention.

Referring to FIG. 15, an operational flow diagram of one exemplary embodiment of operation of the film positioning mechanism in accordance with the present invention is illustrated at 180, which also follows the operational diagrams illustrated in FIGS. 10–13 and previously described herein. Beginning at 182, as a piece of photosensitive film is moved along a film transport path 44, the presence of a piece of photosensitive film is sensed by sensor mechanism 130. The film feed mechanism 88 is then actuated (188), and the photosensitive film is fed into the curved film platen 55 and aligned (192), using the mechanisms in accordance with the present invention, as previously described herein. As film feed mechanism 88 continues to operate (and rollers 126, 128 continue to rotate), after alignment of the film, the film centering mechanism 86 is operated to center the film into a scanning position (196). Once the photosensitive film 55 is in a scanning position, the film feed mechanism 88 is deactivated (200), retaining the photosensitive film in compression against the curved film platen 55 in a fixed scanning position (204) as alignment mechanism 81 biases the film 76 against rollers 126, 128 within V region 171.

Figure 16:
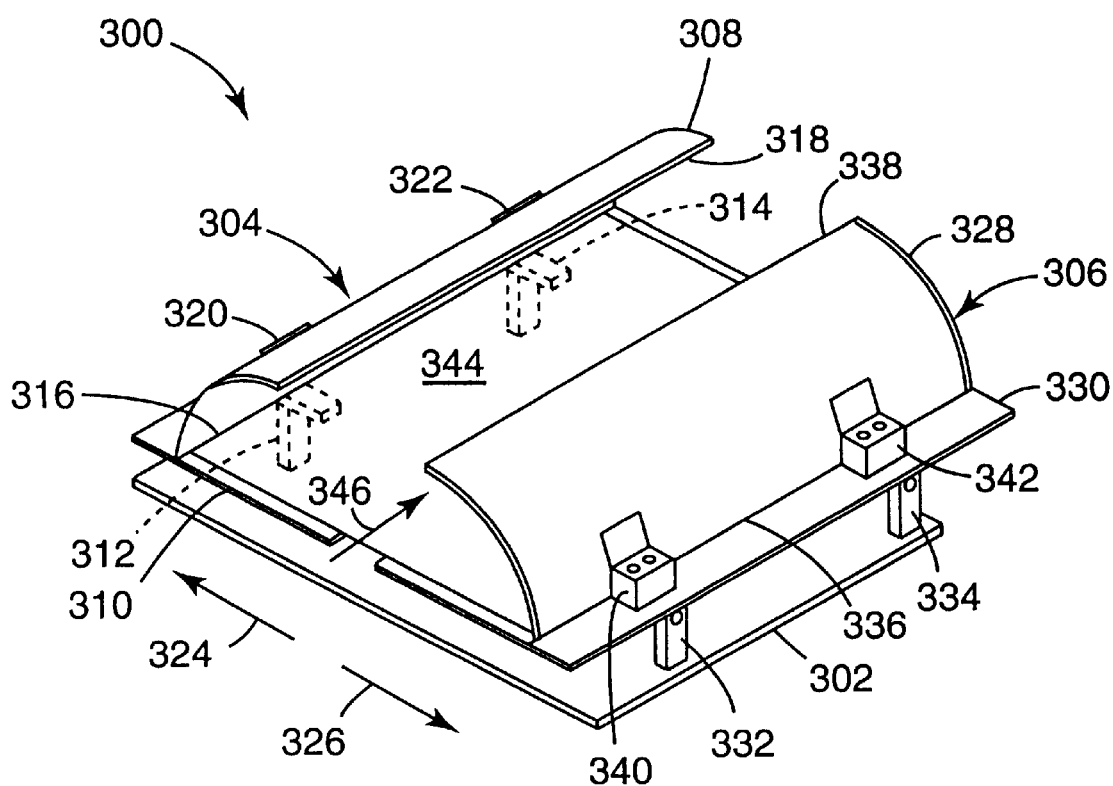
FIG. 16 is a perspective view illustrating an exemplary embodiment of another mechanism for positioning a piece of photosensitive film into a scanning position on a curved film platen.

Referring to FIG. 16, another embodiment of a mechanism for positioning a piece of photosensitive film into a scanning position is generally shown. The present invention provides a method for setting up a sheet of photosensitive film in a cylindrical shape prior to exposing it with a laser or optical scanner assembly as previously described herein. The traditional method for transporting a sheet of film into an internal drum scanner is along its longer axis, because it is easier to control the film. The photosensitive film is pushed inside the cylindrical shell of the internal drum scanner and preparation for exposure. Using this method, however, the photosensitive film is rolled or curved along its shorter axis. If a circular laser or optical sweeping scanner assembly, such as those previously described herein, is translated along this axis, the scan lines are placed in a series which is parallel to its longer axis. Medical images, however, are typically stored and transmitted as a series of lines which run parallel to the shorter axis. Thus, in order for an image to be properly aligned it must be rotated 90° using imaging software methods. Such methods can require a great deal of memory or disc usage.

The present invention provides an apparatus and method for transporting a piece of photosensitive film into an imaging station in a flat form, and then shaping it into a cylinder whose axis is along the direction in which the film was transported. In one preferred embodiment, the film is transported in the more desirable longer axis direction.

As shown in FIG. 16, one exemplary embodiment of a film shaping apparatus in accordance with the present invention is generally shown at 300. The film shaping mechanism includes a frame 302, a first half shell assembly 304, and a second half shell assembly 306. First half shell assembly 304 includes a first half shell 308, a first base 310, and a first slider mechanism 312, and a second slider mechanism 314 (shown in dashed lines). First slider mechanism 312 and second slider mechanism 314 are mechanically coupled between first base 310 and frame 302. First half shell 308 includes a first edge 316 and a second edge 318. Second edge 318 is positioned against base 310, retained in a half shell position by first coupling mechanism 320 and second coupling mechanism 322. First slider mechanism 312 and second slider mechanism 314 allow first half shell assembly 304 to move in a first direction 324 or a second direction 326 relative to frame 302.

Second half shell assembly 306 includes second half shell 328, and a second base 330. Third slider mechanism 332 and fourth slider mechanism 334 are coupled between second base 330 and frame 302. First coupling mechanism 340 and second coupling mechanism 342 couple the second half shell 328 to the second base 330 at first edge 336. Third slider mechanism 332 and fourth slider mechanism 334 allow the second half shell assembly 306 to move in first direction 324 or second direction 326 relative to frame 302.

A piece of photosensitive film 344 is shown positioned within film shaping mechanism 300. The piece of photosensitive film can be fed into the film shaping mechanism 300 flat, in a lengthwise direction, indicated by film feed directional arrow 346. As such, the photosensitive film 344 may be formed into a cylinder along its longer axis.

Figures 17, 18:
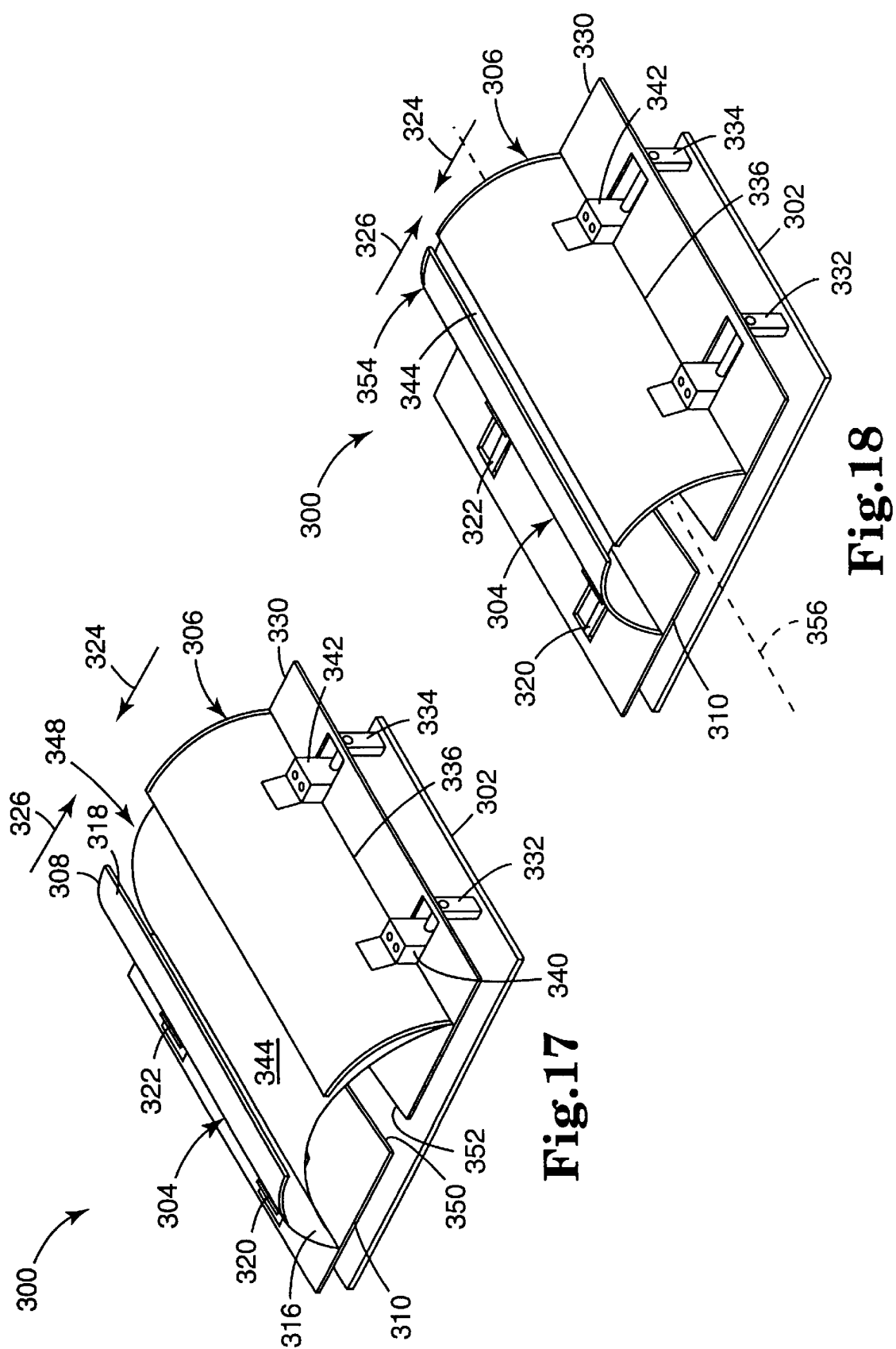
FIG. 17 is a perspective view illustrating an exemplary embodiment of another step in utilizing the mechanism of FIG. 16 for positioning a piece of photosensitive film about the internal surface of a curved film platen.
FIG. 18 is a perspective view illustrating an exemplary embodiment of another step in utilizing the mechanism of FIG. 16 for positioning a piece of photosensitive film about the internal surface of a curved film platen.

The film shaping mechanism 300 in accordance with the present invention forms the photosensitive film 344 into a cylinder using a buckling technique. Referring to FIGS. 17 and 18, operation of the film shaping mechanism 300 is generally shown. Referring to FIG. 17, first slider mechanism 312 and second slider mechanism 314 are operated in direction 326 to move first half shell assembly 304 inward. Similarly, third slider mechanism 332 and fourth slider mechanism 334 are operated to move second half shell assembly 306 in direction 324 toward first half shell assembly 304. The movement of first half shell assembly 304 and second half shell assembly 306 inward causes the film to buckle upward from first base 310 and second base 330, indicated at 348. It is recognized that it may be desirable to elevate the first base 310 and second base 330 along edges 350, 352 to aid in forcing the center of photosensitive film 344 to buckle upward.

Referring to FIG. 18, as first half shell assembly 304 and second half shell assembly 306 continue moving inward, first half shell 308 and second half shell 328 meet to form a curved film platen assembly 354. In this position, photosensitive film 344 has been compressed into the shape of a cylinder. The photosensitive film 344 is now in a scanning position. A laser or optical scanning assembly may now be transported along a longitudinal axis 356, defined by the center of curvature of the photosensitive film 344, for scanning an image onto the photosensitive film 344.

Once a scanning operation is completed, first half shell assembly 304 and second half shell assembly 306 open, moving in an opposite direction to their original position, allowing the film to again fall flat onto the first base 310 and second base 330. The photosensitive film 344 is now available for transport out of the film shaping mechanism 300 film exposure assembly.

Referring to FIGS. 19, 20, 21, and 22, another apparatus and method for shaping a piece of photosensitive film into a cylindrically shaped scanning position is illustrated, using another film buckling technique. Referring to FIG. 19, a cylindrical or drum shaped film platen is generally shown at 360. The film platen 360 includes a film stop edge 362 and a film feed edge 364. Photosensitive film 366 includes a leading edge 368 and a trailing edge 370. The photosensitive film 366 leading edge 368 is fed past film feed edge 364 and positioned against film stop edge 362, indicated by directional arrows 372. Referring to FIG. 20, as photosensitive film 366 continues in film feed direction 372, the portion of the photosensitive film 366 positioned within film platen 360 begins to buckle upward, indicated at 374. Referring to FIG. 21, as the photosensitive film 366 continues to move in the film feed direction 372, the photosensitive film 366 takes on a cylindrical shape within the curved film platen 360. Referring to FIG. 22, once totally positioned within the curved film platen 360, photosensitive film 366 is in a partial cylindrical shaped scanning position. Once in the scanning position, the images may be exposed onto the photosensitive film 366 using assemblies and techniques previously described herein. It is recognized that the properties of the film are an important consideration when forcing a film into a film platen using the above method and apparatus. Photosensitive film 366 must have certain minimum flexural strength which is required for shaping a piece of photosensitive film into a cylindrical shape using the present method. In one preferred embodiment, the thickness of photosensitive film 366 is 7 mil or greater.

Having described the exemplary embodiments of the invention, additional advantages and modifications will readily occur to those skilled in the art from consideration of the specification and practice of the invention disclosed herein. For example, the pair of slider assemblies may each merely comprise a simple spring mechanism which biases the sheet of film onto the film platen, and which are movable independent of each other. Therefore, the specification and examples should be considered exemplary only, with the true scope and spirit of the invention being indicated by the following claims.

What is claimed is:

1. An assembly for positioning a piece of photosensitive film having a leading edge and a trailing edge into a scanning position on a curved film platen in an internal drum scanner assembly, wherein the film platen is defined by a first curved edge, a second curved edge, a film feed edge, and a film stop edge, the assembly comprising:

a first slider block assembly movable relative to the curved film platen;

a second slider block assembly movable relative to the curved film platen and spaced from the first slider block assembly a distance less than a width of the leading edge of the piece of photosensitive film; and a feed mechanism positioned proximate the film feed edge, for feeding the photosensitive film along the curved film platen;

wherein the photosensitive film is fed by the feed mechanism, such that the leading edge of the film moves from a location proximate the film feed edge towards the film stop edge of the curved film platen, and wherein when the photosensitive film is in the scanning position the leading edge of the photosensitive film contacts the first slider block assembly and the second slider block assembly, and the trailing edge of the photosensitive film contacts the feed mechanism, and wherein this contact with the first and second slider block assemblies and the feed mechanism causes the photosensitive film to conform to the curved film platen in alignment between the first slider block assembly and the second slider block assembly, and the feed mechanism.

2. The assembly of claim 1, wherein the first slider block assembly and the second slider block assembly extend through the film platen.

3. The assembly of claim 1, wherein the first slider block assembly and the second slider block assembly are movably coupled to the film platen by way of a guide means, such that each of the first and second slider block assemblies is movable relative to the film platen in a direction substantially parallel to a direction of movement of the photosensitive film along the film platen during feeding by the feed mechanism.

4. The assembly of claim 3 wherein each of the first and second slider block assemblies is independently movable relative to the film platen.

5. The assembly of claim 1, wherein first slider block assembly and the second slider block assembly comprise:

a slider block;

a spring mechanism; and means for coupling the spring mechanism between the slider block and the film platen.

6. The assembly of claim 5, wherein the slider block includes:

a stop member extending inward from the film platen; and guide means for slidably coupling the slider block to the film platen.

7. The assembly of claim 1, wherein the first slider block assembly and the second slider block assembly are installable in the film platen from the curved film platen.

8. The assembly of claim 1, wherein the first slider block assembly and the second slider block assembly extend through a configured opening in the film platen, and wherein each configured opening comprises a rail portion for slidably coupling the slider block to the film platen.

9. The assembly of claim 8, wherein the configured opening further comprises a first open portion for passing the slider block through the film platen.

10. The assembly of claim 9, wherein the configured opening further comprises a second open portion to aid in coupling the slider mechanism to the film platen.

11. The assembly of claim 1, wherein the feed mechanism comprises a pair of feed rollers.

12. The assembly of claim 11, wherein the feed rollers are coupled to a control mechanism.

13. The assembly of claim 1, wherein the feed rollers are longitudinally extending members which are generally parallel to the first slider block assembly and the second slider block assembly.

14. The assembly of claim 1, wherein the feed mechanism comprises a pair of feed rollers in a nip position, the feed rollers forming a V region, and wherein when the photosensitive film is in the scanning position the trailing edge of the photosensitive film is positioned in the V region against the feed rollers.

15. The assembly of claim 1, further comprising:

a controller; and a sensor mechanism positioned adjacent the feed mechanism for providing an output signal to the controller, wherein the output signal is representative of the photosensitive film being fed through the feed mechanism.

16. The assembly of claim 1, further comprising a slider bar coupling the first slider block assembly to the second slider block assembly.

17. An assembly for positioning a photosensitive film having a leading edge and a trailing edge into a scanning position on a curved film platen in an internal drum scanner assembly, wherein the film platen is defined by a first curved edge, a second curved edge, a film feed edge, and a film stop edge, the assembly comprising:

a first slider block assembly;

a second slider block assembly spaced from the first slider block assembly a distance less than a width of the leading edge of the photosensitive film;

a feed mechanism positioned proximate the film feed edge, for feeding the photosensitive film along the curved film platen;

wherein the photosensitive film is fed by the feed mechanism, such that the leading edge of the film moves from a location proximate the film feed edge towards the film stop edge of the curved film platen, and wherein when the photosensitive film is in the scanning position the leading edge of the photosensitive film contacts the first slider block assembly and the second slider block assembly, and the trailing edge of the photosensitive film contacts the feed mechanism, and wherein this contact with the first and second slider block assemblies and the feed mechanism causes the photosensitive film to conform to the curved film platen in alignment between the first slider block assembly and the second slider block assembly, and the feed mechanism; and a centering mechanism movably coupled to the film platen which centers the photosensitive film into the scanning position.

18. The assembly of claim 17, wherein the centering mechanism includes:

a slot located adjacent the first curved edge;

a centering arm extending through the slot; and means coupled to the centering arm for moving the film along the film platen in a direction generally perpendicular to the feed direction of the film.

19. The assembly of claim 18, wherein the means for moving the film includes a motor having a screw mechanism coupled to the centering arm.

20. The assembly of claim 17 wherein each of the first and second slider block assemblies is independently movable relative to the film platen.

* * * * *